No. 736,326. PATENTED AUG. 11, 1903.
W. A. WHITNEY.
LOCK NUT.
APPLICATION FILED DEC. 6, 1902.
NO MODEL.
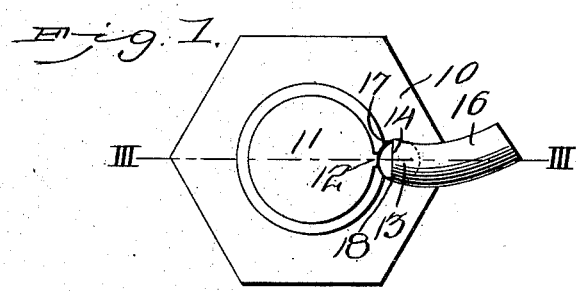
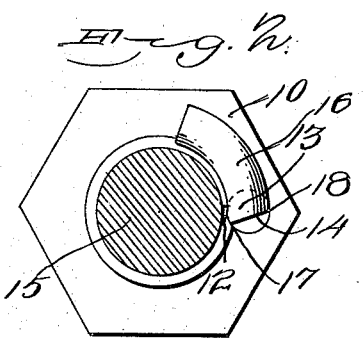
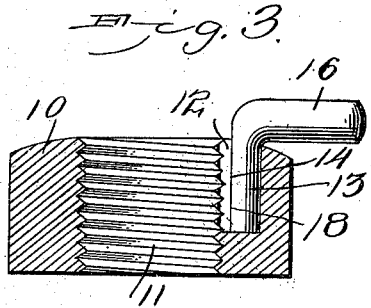
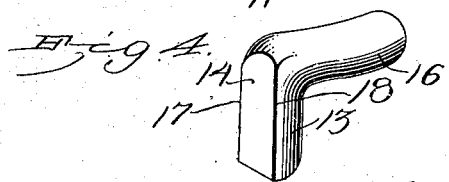
Witnesses
E. F. Stewart
C. H. Woodward
W. A. Whitney, Inventor
by C. A. Snow & Co.
Attorneys No. 736,326. Patented August 11, 1903.

UNITED STATES PATENT OFFICE.

WILLIAM A. WHITNEY, OF OREGON, ILLINOIS, ASSIGNOR TO THE AMERICAN LOCK NUT COMPANY OF OREGON, OF OREGON, ILLINOIS.

LOCK-NUT.

SPECIFICATION forming part of Letters Patent No. 736,326, dated August 11, 1903.

Application filed December 6, 1902. Serial No. 134,167. (No model.)

*To all whom it may concern:*

Be it known that I, WILLIAM A. WHITNEY, a citizen of the United States, residing at Oregon, in the county of Ogle and State of Illinois, have invented a new and useful Lock-Nut, of which the following is a specification.

This invention relates to devices employed for the purpose of preventing nuts running backward from bolts, and has for its object the production of a simply-constructed and easily-applied locking means embodied in a nut of ordinary construction, by which the nut may be very quickly and easily locked to the bolt.

The invention consists in a nut provided with a cylindrical recess extending partially through the nut adjacent to the central threaded opening and communicating therewith and a cylindrical pin adapted to fit the cavity, with one side flattened, so that when inserted into the recess with the flattened side next to the threaded opening the presence of the pin will not prevent the insertion of the bolt, but when the nut is screwed down upon the bolt as far as required and the pin rotated the cylindrical portion of the pin will impinge against the threads of the bolt and firmly lock the nut in place thereon.

Other novel features of the invention will appear in the annexed description and be specified in the claims following.

In the drawings illustrative of the invention, Figure 1 is a plan view of a nut with the invention applied in its open or inoperative position. Fig. 2 is a plan view of a nut with the improvement attached thereto and the nut in position upon a bolt, the bolt being in transverse section and the improved locking device in operative position. Fig. 3 is a transverse section on the line III III of Fig. 1. Fig. 4 is a perspective view of the locking-pin detached.

This invention may be applied to any form of nut, such as square, hexagonal, circular, or other form; but for the purpose of illustration the invention is shown applied to an ordinary hexagonal nut; but it will be understood that I do not wish to be limited in the application of the invention to any specific form of nut.

The nut is represented at 10, with the usual threaded aperture 11. Formed in the body of the nut adjacent to the opening 11 and partially extending into it is a cylindrical recess 12, the recess extending only partially through the nut, as shown in Fig. 3.

The locking-pin is illustrated in Fig. 4 and consists in a cylindrical portion 13, adapted to closely fit the cylindrical recess 12 and with one side 14 flattened, the flattened portion corresponding to the extent to which the pin would project into the central opening 11 if the pin were a complete circle, so that when the pin is inserted into the recess with the flat portion next to the opening 11 the presence of the pin will not prevent the nut being placed in position upon the bolt, the latter being indicated at 15 in Fig. 2. The pin 13 will be provided with means for forcibly rotating it, and this means, for illustration, consists of an arm 16, extending from the upper end of the pin outside of the nut. It will be obvious that by removing a portion of one side of the pin to produce the flattened side 14 knife-edges 17 18 are formed between the portions 13 and 14, the knife-edges being comparatively sharp. The pin 13 will preferably be formed of hardened steel, so that when the nut is set "home" upon its seat and the pin 13 inserted into the cavity 12 and forcibly rotated by any suitable implement applied to the portion 16 one of the knife-edges 17 or 18, as the case may be, will be forcibly impinged against the threads of the bolt which for the time being come opposite the flattened portion of the pin and cut recesses in the thread transversely thereof, and thus very effectually lock the nut fast to the bolt. The portion 16 will preferably be curved, as indicated, and will be turned in the direction of the curve, so that when the pin is in its locked position the part 16 will lie substantially parallel or concentric to the bolt, as shown in Fig. 2, and thus project to the least possible extent. The pin 13 will generally be rotated toward the concave side of the portion 16, as indicated, but may be rotated in either direction, as either of the knife-edges 17 or 18 may be employed for forming the locking-recesses across the threads. To release the nut, it is only necessary to reverse the movement of the pin or until the flattened portion 14 is again in alinement with the threads, as will be obvious. The locking-pin may thus be repeatedly used, and when one knife-edge becomes worn the other can be employed.

The recess 12 will preferably be formed opposite one of the corners of the nut, so that it will not weaken the nut, and will extend only partially through the nut, to mutilate the nut to the least possible extent.

This makes a very simple, cheap, and easily-applied device, which will very effectually lock the nut fast to the bolt, while at the same time the nut may be very easily released when required and the locking means employed repeatedly.

Having thus described the invention, what is claimed is—

The combination with a nut having a central threaded opening and provided with a cylindrical recess communicating at one side with the central opening, of a substantially semicylindrical pin mounted in the recess and having two cutting edges, either of which is adapted to bite into and engage the threads of a bolt and lock the nut thereto, and means for forcibly rotating the pin in either direction to engage either of its cutting edges with a bolt.

In testimony that I claim the foregoing as my own I have hereto affixed my signature in the presence of two witnesses.

WILLIAM A. WHITNEY.

Witnesses:
C. S. HAAS,
C. D. ETNYRE.